Sept. 3, 1935.  J. DUSEVOIR  2,013,039
CRANK SHAFT
Filed July 28, 1932
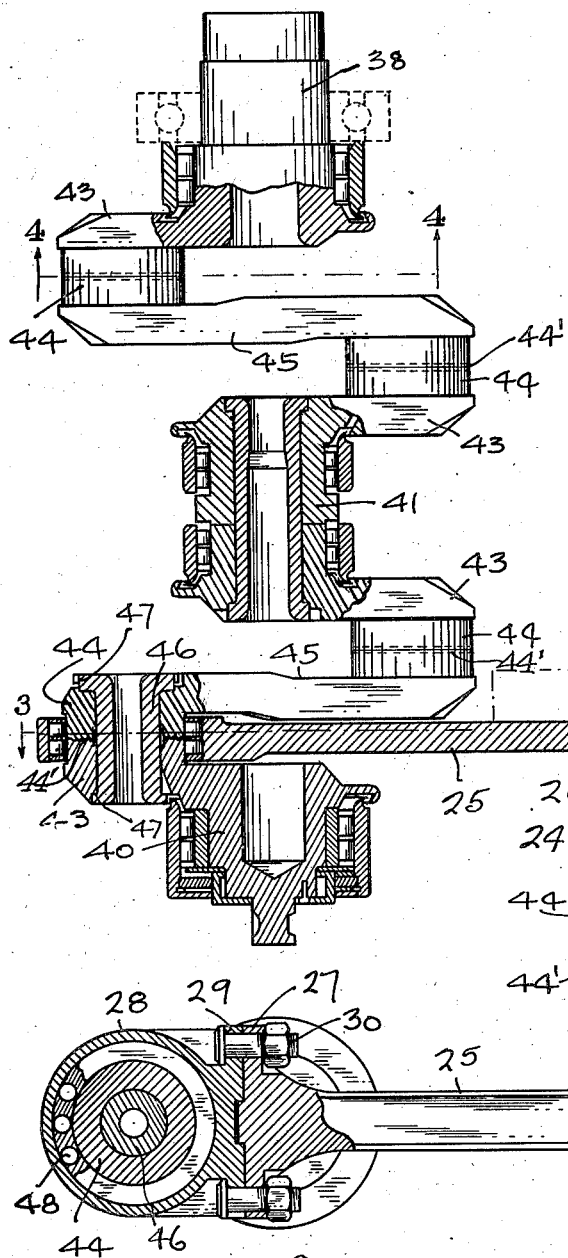
FIG. 1.
FIG. 3.
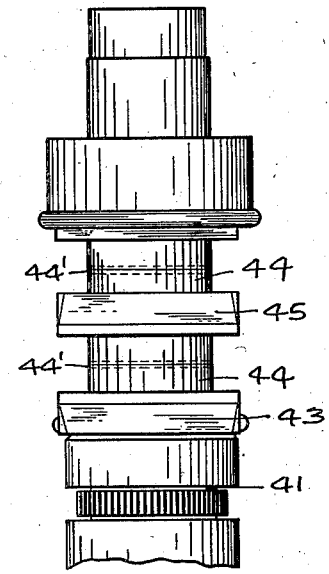
FIG. 2.
FIG. 4.
INVENTOR.
JULIUS DUSEVOIR.
BY
ATTORNEYS.

Patented Sept. 3, 1935

2,013,039

UNITED STATES PATENT OFFICE 2,013,039

CRANK SHAFT

Julius Dusevoir, San Leandro, Calif., assignor to Dusevoir Aviation Motors, Inc., a corporation of California Application July 28, 1932, Serial No. 625,231

5 Claims. (Cl. 74—598)

An object of the invention is to provide an engine construction wherein the crank shaft is built up out of the necessary shafts, throws, and crank arms, whereby the overall length thereof is much less than the length of the crank shaft forged from a single block of metal, and at the same time the design of the built up crank shaft is stronger than a solid crank shaft, and reduces torsion and vibration to a minimum. My built up crank shaft has each of the throws therein split on a plane transversely to the axis of each throw, and the split portions of the throw are suitably held together to resist any torque tending to turn one split portion relative to the other, which construction permits of the use of a solid circular bearing on an end of each connecting rod.

Other objects and advantages are to provide a crank shaft that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawing:

Fig. 1 is a view of the engine crank shaft removed from the engine, with a portion thereof indicated in section.

Fig. 2 is a side view of Fig. 1.

Fig. 3 is a section taken through Fig. 1 on the line 3—3.

Fig. 4 is a section taken through Fig. 1, on the line 4—4.

A connecting rod 25 is provided in each cylinder not shown, the upper end of each connecting rod being rotatably journaled on the wrist pin 24, there being an antifriction roller bearing 26 interposed between the connecting rod and wrist pin. The lower end of the connecting rod is provided with a pad 27 thereon. A complete circle bearing 28 having a pad 29 on one side of the circumference thereof, is adapted to be secured by the bolts 30 to the pad 27 on the lower end of the connecting rod 25. The bearing 28 is formed as a complete circle and is not split transversely on a line parallel to the central axis thereof as is the case with the usual connecting rod bearing.

The opposite shaft ends of the engine crank shaft are adapted to be supported in the bearings formed in the engine crank case. The crank shaft is a built up crank shaft, contrasted with a crank shaft forged from a single block of metal. The crank shaft consists of the opposite shaft sections 38 and 40 each of which is journaled in the respective end plates of the crank case; a central shaft section 41 journaled in a frame not shown arranged within the crank case; crank arms 43 extending from the respective shaft sections 28, 40 and 41; crank throws 44 mounted on the ends of the respective crank arms 43; and crank arms 45 connecting the respective throws. Each of the crank throws 44 connecting each of the respective pairs of crank arms 43 and 45 is split on a line transversely to the longitudinal axis of the said crank throw. The opposed split faces 44, 44' of each crank throw are provided with a series of arcuate serrations, both of which are adapted to interfit, to resist any torque tending to turn one part of said throw relative to the other about the axis thereof. The arcuate serrations on the opposed split faces of each crank throw are struck on an arc, the radius of which is preferably greater than the distance between the axes of the shaft sections and crank throws. I have found that the arcuate serrations on the split faces of the crank throw will resist any turning torque thereupon, altho other types of serrations may be formed on said faces which will also effectively resist any turning torque applied to the throw.

Each crank throw 44 is tubular in cross section and a bushing 46 is extended through the hollow interior of the throw, said bushing being provided with shoulders 47 on the opposite ends thereof to hold the said split throw together. Each crank throw 44 is split in the manner heretofore described to facilitate the mounting thereof within the solid circular bearing 28 of the connecting rod 25. A roller bearing 48 is arranged around the crank throw 44 within the solid circular connecting rod bearing 28. In order to remove the connecting rod bearing from the throw, it is first necessary to take out the bushing which holds the opposite halves of the split throw together. After the bushing has been removed, the opposite halves of the crank throw may be separated and the connecting rod removed therefrom. The central crank shaft bearing 41 is supported within the crank case.

Having thus described this invention, what I claim and desire to secure by Letters Patent is:

1. In an internal combustion engine, a built up crank shaft, said shaft having each crank throw split on a plane transversely to the axis of the throw and the matching faces of said split throws being serrated throughout the area thereof by parallel grooves struck from a point eccentric to the axis of the throw to prevent axial disalignment of the throw; and means extended axially thru the throw to hold the matching faces of the throw in engagement with each other.

2. A coupling comprising a pair of members having the matching faces thereof provided with a series of arcuate serrations through the area thereof by parallel grooves struck from a point eccentric to the axis of the throw, to effect a nested relationship of the serrated faces when coupled together, to resist any torque tending to turn one of said members relative to the other about their own axes.

3. A crank shaft including shaft sections, crank arms, and crank throws, each crank throw being split on a plane transversely to the axis thereof, the opposed split faces being provided with a series of arcuate serrations throughout the area thereof by parallel grooves struck from a point eccentric to the axis of the throw, both of which are adapted to interfit to resist any torque tending to turn one part of said throw relative to the other about the axis thereof.

4. A crank shaft including shaft sections, crank arms, and crank throws, each crank throw being split on a plane transversely to the axis thereof, the opposed split faces being provided with a series of arcuate serrations both of which are adapted to interfit to resist any torque tending to turn one part of said throw relative to the other about the axis thereof, the arcuate serrations being struck on an arc, the radius of which is greater than the distance between the axes of shaft sections and crank throws.

5. In an internal combustion engine, a crank shaft; a throw on said crank shaft opposite each cylinder of the engine, each throw being cylindrical in cross section and being split on a line transversely to the axis of said throw, the abutting faces of the split end of each throw being provided with matching serrations throughout the area thereof by parallel grooves struck from a point eccentric to the axis of the throw to resist any torque tending to turn one portion of said throw relative to the other about their own axes; and a bushing extended through each cylindrical throw having shoulders on the ends thereof to hold the split throw together.

JULIUS DUSEVOIR.